US012574465B2

(12) United States Patent (10) Patent No.: US 12,574,465 B2
Aono et al. (45) Date of Patent: Mar. 10, 2026

(54) ELECTRONIC DEVICE

(71) Applicant: SEIKO EPSON CORPORATION, Tokyo (JP)

(72) Inventors: Munetoyo Aono, Matsumoto (JP); Motofumi Otani, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 232 days.

(21) Appl. No.: 18/423,503

(22) Filed: Jan. 26, 2024

(65) Prior Publication Data

US 2024/0259509 A1 Aug. 1, 2024

(30) Foreign Application Priority Data

Jan. 27, 2023 (JP) ................................. 2023-010724

(51) Int. Cl.
*H04N 1/00* (2006.01)

(52) U.S. Cl.
CPC ..... *H04N 1/00496* (2013.01); *H04N 1/00411* (2013.01); *H04N 1/00477* (2013.01); *H04N 1/00557* (2013.01); *H04N 1/00564* (2013.01)

(58) Field of Classification Search
CPC ........... H04N 1/00496; H04N 1/00411; H04N 1/00477
See application file for complete search history.

(56) References Cited

U.S. PATENT DOCUMENTS

2012/0305726 A1* 12/2012 Hashimoto ........ G03G 21/1661
248/292.12
2017/0310838 A1* 10/2017 Saito .................. H04N 1/00496

FOREIGN PATENT DOCUMENTS

JP 2017-198751 A 11/2017

* cited by examiner

*Primary Examiner* — Ibrahim Siddo
(74) *Attorney, Agent, or Firm* — WORKMAN NYDEGGER

(57) ABSTRACT

The printing device includes an operation section 15, an angle adjustment mechanism 60, a locking mechanism 70, and a raising mechanism 80. The locking mechanism 70 switches from the locked state to the unlocked state when a specific operation is performed on the operation section 15 in the locked state. The angle adjustment mechanism 60 is provided with the receiving member 63 provided in the operation section 15, and a contacting member 64 for holding the operation section 15 at an arbitrary angle by the raising mechanism 80 of the operation section 15. The receiving member 63 is provided with a portion where the contacting force of the contacting member 64 to the receiving member 63 becomes smaller than the predetermined force in the process that the operation section 15 is raised by the prescribed angle.

8 Claims, 7 Drawing Sheets

ELECTRONIC DEVICE

The present application is based on, and claims priority from JP Application Serial Number 2023-010724, filed Jan. 27, 2023, the disclosure of which is hereby incorporated by reference herein in its entirety.

BACKGROUND

1. Technical Field

The present disclosure relates to an electronic device including an operation section such as an operation panel.

2. Related Art

For example, JP-A-2017-198751 discloses a printing device as an example of an electronic device provided with an operation section such as an operation panel. The printing device includes an operation section such as an operation panel in a pivotable manner. Therefore, the user can adjust the angle of the operation section to an angle at which the operation section is easily viewed.

In the printing device of JP-A-2017-198751, a housing in which an operation section, such as an operation panel, is provided in a pivotable manner is provided with a recessed portion around the operation section for finger hooking. The user pivots the operation panel by hooking his/her finger in the side wall of the operation panel exposed through the recess portion for finger placement. However, it is necessary to hook a finger at the position of the recessed portion for finger hooking, and there is a problem in that the flexibility of operation when adjusting the angle of the operation panel is limited. In a case where the operation section is provided on the top surface of the electronic device, there is a case where a small stationery object, such as a clip, easily falls into the recess portion for finger hooking, which is provided around the operation section. Since the recess portion for finger hooking is functionally required around the operation panel, the flexibility in improving the design of the electronic device may be limited. For this reason, there is a demand for an electronic device including an operation section such as an operation panel that allows a user to relatively easily perform a pivotal operation even without a recessed portion for finger hooking.

SUMMARY

An electronic device, according to solve the above-described problem, includes an operation section that is provided on a top surface or a side surface of a housing and on which input for controlling an operation of the electronic device is performed, a storage section that is provided in the housing and in which the operation section is stored, an angle adjustment mechanism configured to adjust an angle of the operation section with respect to the housing, a locking mechanism configured to lock the operation section at a position where the operation section is housed in the storage section, and a raising mechanism for raising the operation section to a predetermined angle when the locked state of the locking mechanism is released, wherein the locking mechanism is configured to enter a locked state in which the locking mechanism locks with the operation section when the operation section is housed in the storage section and to switch from the locked state to the unlocked state when a specific operation is performed on the operation section in the locked state, the angle adjustment mechanism has a receiving member located in the operation section and a contacting member configured to hold the operation section at an arbitrary angle by contacting with a predetermined force against a receiving surface of the receiving member in a process of moving together with the receiving member pivoting to an angle larger than the predetermined angle raised by the raising mechanism of the operation section, and the receiving member includes a portion in which a contacting force of the contacting member against the receiving member becomes smaller than the predetermined force in a process in which the operation section is raised to the predetermined angle when the locked state by the locking mechanism is released.

DESCRIPTION OF EMBODIMENTS

Hereinafter, an embodiment of the electronic device will be described with reference to the drawings. The electronic device of the present embodiment is a printing device for printing on a medium such as a sheet of paper.

Figure 1:
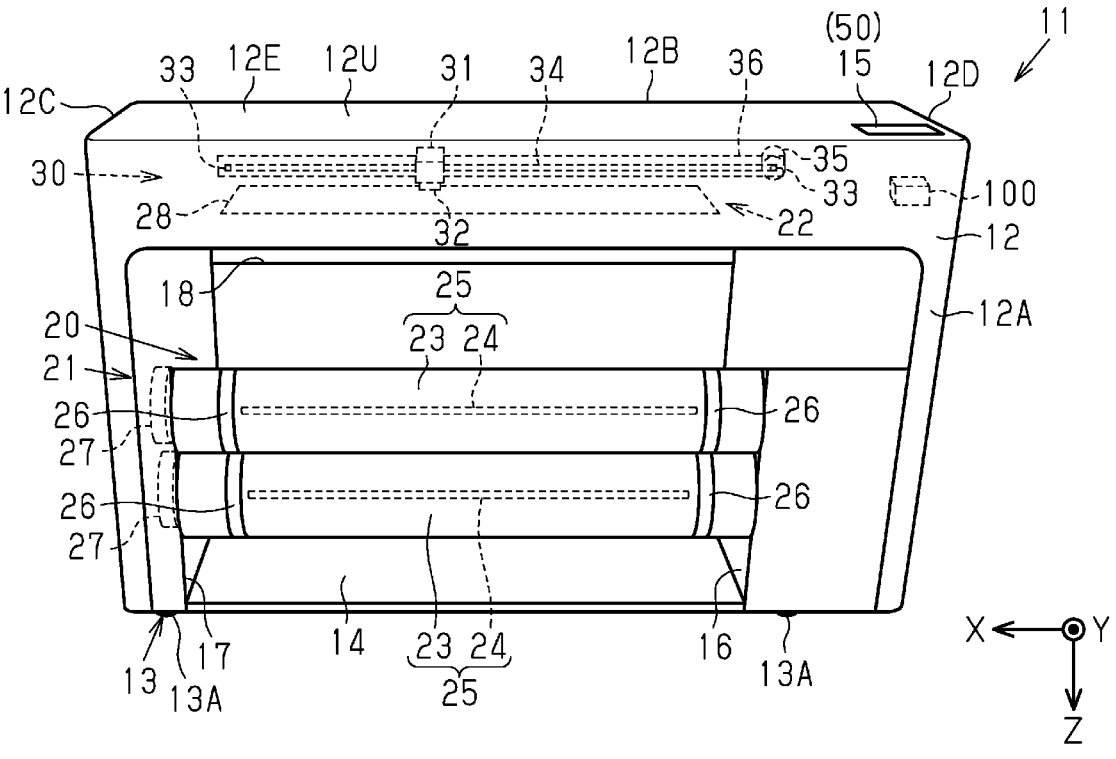
FIG. 1 is a front perspective view of the printing device according to the present embodiment.

In FIG. 1, the Z-axis is defined as an imaginary axis parallel to the vertical direction Z on the assumption that a printing device 11 is placed on a horizontal plane. Two virtual axes parallel to two directions along a virtual plane orthogonal to the Z-axis are defined as an X-axis and a Y-axis, respectively. A direction parallel to the X-axis is referred to as an X-direction, and a direction parallel to the Y-axis is referred to as a Y-direction. The transport direction in which the medium 23 is transported changes according to the position of the medium 23 on the transport path. Since the X-direction is equal to the width direction intersecting the transport direction of the medium 23, it is also referred to as the width direction X. Furthermore, since the Y-direction is equal to the transport direction of the medium 23 at the printing position when a print head 32 mounted on a carriage 31 performs printing on the medium 23, the Y-direction is also referred to as a transport direction Y. Note that the Z-direction includes a downward direction +Z which is a gravity direction and an upward direction −Z which is a direction opposite thereto.

Configuration of Printing Device 11

The printing device 11, according to the present embodiment, is an inkjet printer that prints characters, images, and the like on the medium 23 such as a sheet of paper by ejecting a liquid such as ink onto the medium 23. The printing device 11 rotatably holds a roll 25 in which the medium 23 is wound on a core body 24, and performs printing on the medium 23 fed from the roll 25.

As shown in FIG. 1, the printing device 11 includes a housing 12 and a leg section 13 for supporting the housing 12. The housing 12 has a substantially rectangular parallelepiped shape. The housing 12 has a front wall 12A, a rear wall 12B, a first side wall 12C, a second side wall 12D, a top wall 12E, and a base frame 14 supported by the leg section 13. In addition, the leg section 13 includes casters 13A.

As shown in FIG. 1, the printing device 11 includes an operation section 15 where inputs are made to control the operation of the printing device 11. The operation section 15 is, for example, an operation panel 50. The operation section 15 is provided on a top surface 12U of the housing 12. More specifically, the operation section 15 is disposed at one end of the top wall 12E of the housing 12.

As shown in FIG. 1, the housing 12 has an accommodation section 16 capable of housing two cylindrical rolls 25 in the front portion. The accommodation section 16 has an opening 17 in a lower portion of the front wall 12A of the housing 12, and the roll 25 can be attached and detached through the opening 17 from the front side. The printing device 11 includes a roll holding section 26 in the accommodation section 16. The roll holding section 26 holds the roll 25 in which the elongated medium 23 is wound on the core body 24. In the example shown in FIG. 1, two roll holding sections 26 are arranged side by side in the vertical direction Z in the accommodation section 16. Therefore, the two rolls 25 are accommodated in the accommodation section 16 in a state of being arranged side by side in the vertical direction Z.

As shown in FIG. 1, the printing device 11 includes a transport mechanism 20 for transporting the medium 23 from the roll 25. The transport mechanism 20 includes a feeding section 21 that supplies the medium 23 from the roll 25 and a transport section 22 that transports the medium 23 supplied from the roll 25.

Two roll holding sections 26 rotatably hold the rolls 25 with the axes extending in the width direction X as the rotation centers. The feeding section 21 supplies the medium 23 from the roll 25 by rotating the roll 25 together with the roll holding section 26 by a driving force of a feed motor 27 which is a driving source. The transport section 22 includes a pair of rollers (not illustrated) that can transport the medium 23 supplied from the roll 25. The transport section 22 transports the medium 23 along a transport path by a pair of rollers. At a position along the transport path of the medium 23, there is a printing area in which printing is performed on the medium 23. A support plate 28 for supporting the medium 23 is disposed in the printing area. The support plate 28 is, for example, a platen, but may be a transport belt.

As shown in FIG. 1, the printing device 11 includes a printing section 30 at a position above the accommodation section 16 in the housing 12. The printing section 30 performs printing on the medium 23 at a position along the transport path along which the transport mechanism 20 transports the medium 23. Specifically, the printing section 30 includes the print head 32 that performs printing on the medium 23 transported in the transport direction Y in the printing area, and the carriage 31 on which the print head 32 is mounted. The carriage 31 is configured to move (scan) in a width direction X that intersects the transport direction Y.

In detail, the carriage 31 is guided to be movable in the width direction X along a guide rail 36. The carriage 31 is fixed to a part of an endless timing belt 34 wound around a pair of pulleys 33 positioned in the vicinity of both end portions of the guide rail 36. When a carriage motor 35 is driven and one of the pulleys 33 is rotationally driven, the timing belt 34 is rotated. The carriage 31 reciprocates in the width direction X along the guide rail 36 when the timing belt 34 rotates forward and backward by the forward and backward driving of the carriage motor 35. Characters, images, or the like are printed on the medium 23 by the print head 32 ejecting ink while the carriage 31 is moving. The print head 32 performs printing on a portion of the medium 23 supported by the support plate 28. The printed medium 23 printed by the printing section 30 is cut along the width direction X by a cutter of a cutting mechanism (not shown). The printed medium 23 is discharged from a discharge port 18 opened in the front wall 12A of the housing 12 by a pair of discharge rollers (not shown) constituting the transport section 22.

The printing device 11 may include an automatic feeding mechanism (not illustrated) in which when the medium 23 of one of the two rolls 25 runs out, the medium 23 from the other roll 25 is automatically fed. In this case, in the printing device 11, when one roll 25 is supplied to the rear end of the medium 23 and reaches the end, next, the transport of the preset starting end of the other roll 25 is started. As described above, the printing device 11 may be configured to print two rolls without any operator.

The printing device 11 includes a control section 100 that controls the printing device 11. The control section 100 controls the operation section 15, the transport mechanism 20, the printing section 30, the cutting mechanism, and the like.

Configuration of Upper Portion of Printing Device 11

Next, the configuration of the upper portion of the printing device 11 will be described with reference to FIG. 2.

Figure 2:
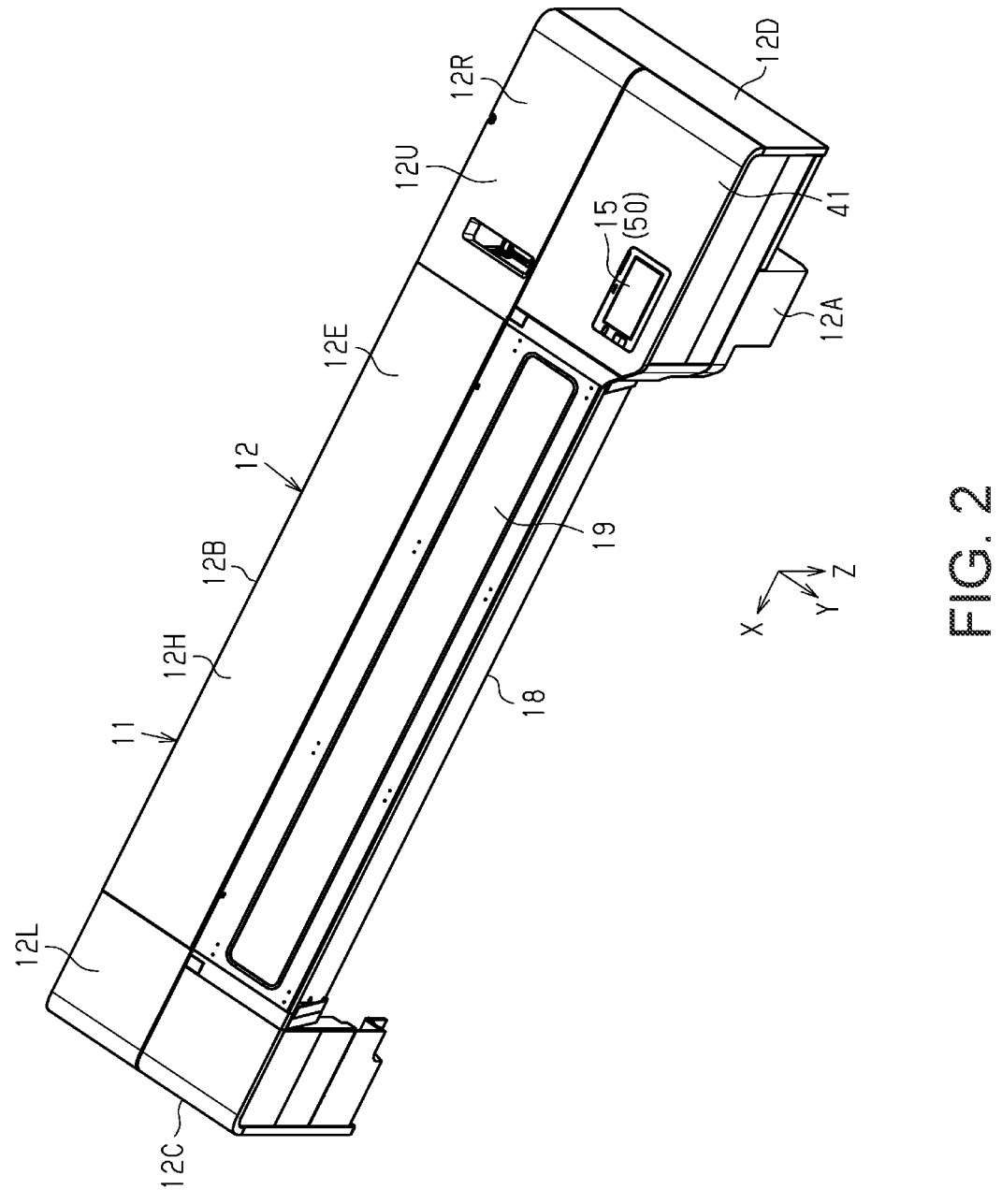
FIG. 2 is a perspective view showing an upper section of the printing device.

As shown in FIG. 2, the top surface 12U of the housing 12 is formed into a substantially flat surface. The housing 12 has a main body section 12H disposed in the center, a left end section 12L disposed on the left side of the main body section 12H, and a right end section 12R disposed on the right side of the main body section 12H.

In the housing 12, the main body section 12H, where printing takes place inside, includes an elongated window section 19 which is long in the widthwise direction X on the top wall 12E thereof. The window section 19 is provided, for example, for a user to see a printing result on the medium 23 before the medium 23 is discharged from the discharge port 18. The housing 12 includes a first cover member 41 surrounding a placement area of the operation panel 50.

As shown in FIG. 2, the operation section 15 is located further inward than the outer periphery of the top surface 12U of the housing 12. A flat design with as little unevenness as possible is adopted for the top surface 12U of the printing device 11. Therefore, the operation section 15 is housed substantially flush with the top surface 12U of the housing 12. The operation section 15 can be manually raised to a desired angle with respect to the top surface 12U by a user. However, for example, a recess for finger hooking is not provided around the operation section 15 in order to attach importance to design and to avoid that small stationery objects such as a clip fall inside. For this reason, even when the printing device 11 does not have a recess for finger hooking, a mechanism is incorporated that enables the user to relatively easily raise the operation section 15, which is accommodated in a state of being partially stored in the housing 12 in a state of being substantially flush with the top surface 12U.

Configuration of Operation Panel 50

Figure 3:
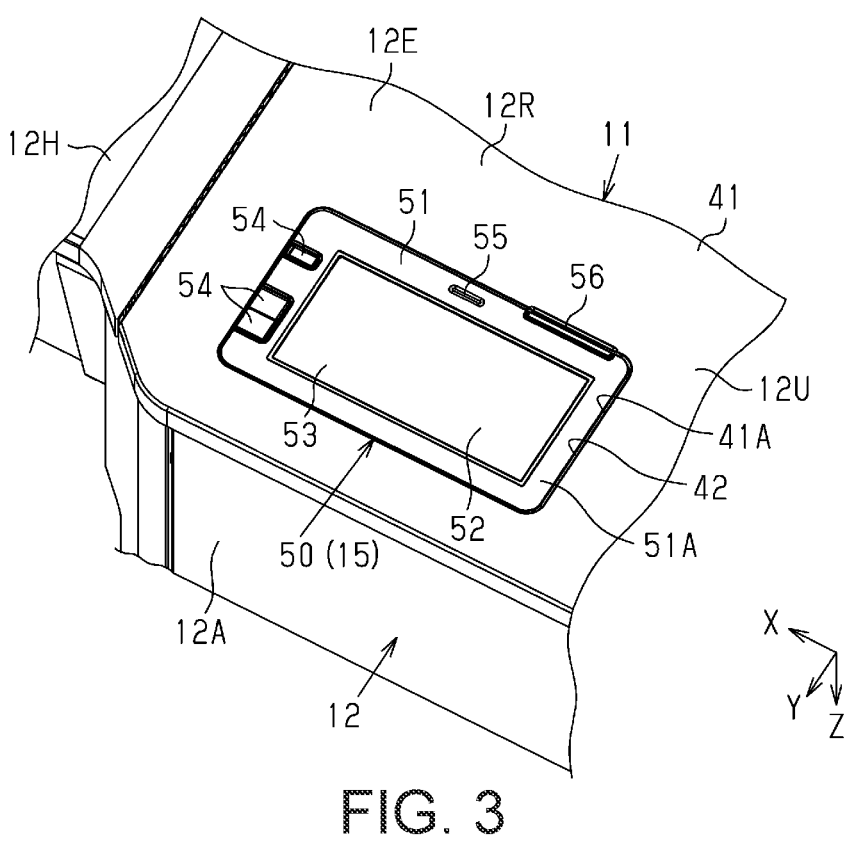
FIG. 3 is a perspective view showing a portion of the printing device where an operation panel is disposed.

As shown in FIG. 3, the operation section 15 is the operation panel 50. The operation panel 50 is provided with a rectangular plate-shaped panel body 51. The operation panel 50 (the operation section 15) includes a display section 52 that displays a state of the printing device 11 and operation content. The display section 52 is assembled on an operated surface 51A side (front surface side) of the panel body 51. The display section 52 of the present embodiment is, for example, a touch panel 53 for operation input. Therefore, the user can perform an input operation such as instructing the printing device 11 by touching the touch panel 53.

As shown in FIG. 3, the operation panel 50 may include an operation button 54. The operation button 54 may include, for example, any one of a power button, a cancel button, a print start button, and a selection button. The power button may be located at a predetermined position other than the operation panel 50 on the housing 12. As described above, the operation panel 50 may have an operation function capable of allowing the user to input an operation and a display function for displaying the contents of the operation and the state of the printing device 11.

As shown in FIG. 3, a storage section 42 in which operation panel 50 is stored is provided on the top surface 12U of the housing 12. The first cover member 41 has an opening 41A in a region corresponding to the storage section 42. Specifically, the first cover member 41 is a plate-shaped member having the opening 41A in the portion of the placement area of the operation panel 50. The operation panel 50 positioned at a portion corresponding to the opening 41A is housed in the storage section 42. Therefore, the operation panel 50 is housed in the storage section 42 in the state where the first cover member 41 is mounted. In this respect, the opening 41A of the first cover member 41 constitutes a part of the storage section 42.

In a state where the first cover member 41 is attached as a part of the housing 12, the operated surface 51A (front surface) of the operation panel 50 is exposed from the opening 41A. In FIG. 3, the operation panel 50 is disposed in a storage posture in which the operation panel 50 is stored substantially horizontally. The operation panel 50 of the present embodiment is configured to be angle-adjustable from a substantially horizontal storage posture in which the operation panel 50 is stored in the storage section 42 to a posture (refer to FIGS. 9 and 11) at an angle desired by the user with respect to the top surface 12U.

In FIG. 3 in which the operation panel 50 is in the storage posture, almost all of the panel body 51 in the thickness direction is stored in the storage section 42. Therefore, when the operation panel 50 is in the stored posture, the operated surface 51A (front face) of the operation panel 50 is substantially flush with the top surface 12U of the housing 12.

Incidentally, as shown in FIG. 3, in the configuration in which the operation panel 50 is accommodated substantially flush with the top surface 12U, when the user pivots the operation panel 50 from the accommodated posture to the posture of a desired angle, it is necessary to hook a finger on the operation panel 50. For this reason, it is necessary to provide a recess around the operation panel 50 to expose the side wall on which a finger is hooked. However, this type of recess causes a problem that small stationery objects, such as a clip, fall inside. On the other hand, it is possible to make the operation panel 50 easy to hold by positioning the side portion of the operation panel 50 slightly higher than the top surface 12U. However, the operation panel 50 and the top surface 12U cannot be substantially flush with each other, so it is difficult to adopt a design in which the top surface 12U is substantially flat.

As shown in FIG. 3, the operation panel 50 of the present embodiment has a mark 55 indicating a position to be pressed by the user and a light emitting section 56 in a portion other than the display section 52 on the operated surface 51A of the panel body 51. In FIG. 3, the operation panel 50 is configured to be pivotable about an end portion that is on the opposite side from the mark 55, with the display section 52 interposed therebetween in the transport direction Y. Then, when the user presses the position of the mark 55, engagement that holds the operation panel 50 in the housed posture is released, and the operation panel 50 is raised (see FIG. 9) by a predetermined angle (for example, a predetermined value within a range of 5 to 30 degrees) with respect to the top surface 12U, by the biasing force of a spring 82 (see FIG. 9).

Therefore, there is no recess for finger hooking around the operation panel 50 in the storage posture (see FIG. 3). Therefore, there is no concern that a small stationery object such as a clip falls into the recess. Moreover, even if there is no recess for hooking the finger, when the user presses the mark 55 on the panel body 51, the operation panel 50 rises to the predetermined angle, so that a finger can be hooked on the exposed side wall of the operation panel 50. Thus, even if the top surface 12U of the printing device 11 has a flat design with little or no unevenness, the user can relatively easily adjust the angle of the operation panel 50 from the storage posture to a desired angle. It may be noted that the operation panel 50 in the storage posture shown in FIG. 3 may be in a state of slightly protruding or slightly recessed with respect to the top surface 12U.

The light emitting section 56 is constituted by, for example, an LED, and can light up, blink, or both. The light emitting section 56 is positioned at an upper end portion of the panel body 51 when the user pivots the operation panel 50 to a desired posture angle. Therefore, the user can easily visually check the light emission or blinking of the light emitting section 56. Note that detailed structure of an angle adjustment mechanism 60 capable of adjusting the angle of the operation section 15 with respect to the housing 12, a locking mechanism 70 for locking the operation section 15 in the storage posture in which the operation section 15 is stored in the storage section 42, and a raising mechanism 80 for raising the operation section 15 to the predetermined angle when the mark 55 of the operation section 15 is pressed will be described later.

Configuration of Operation Panel 50

Figure 4:
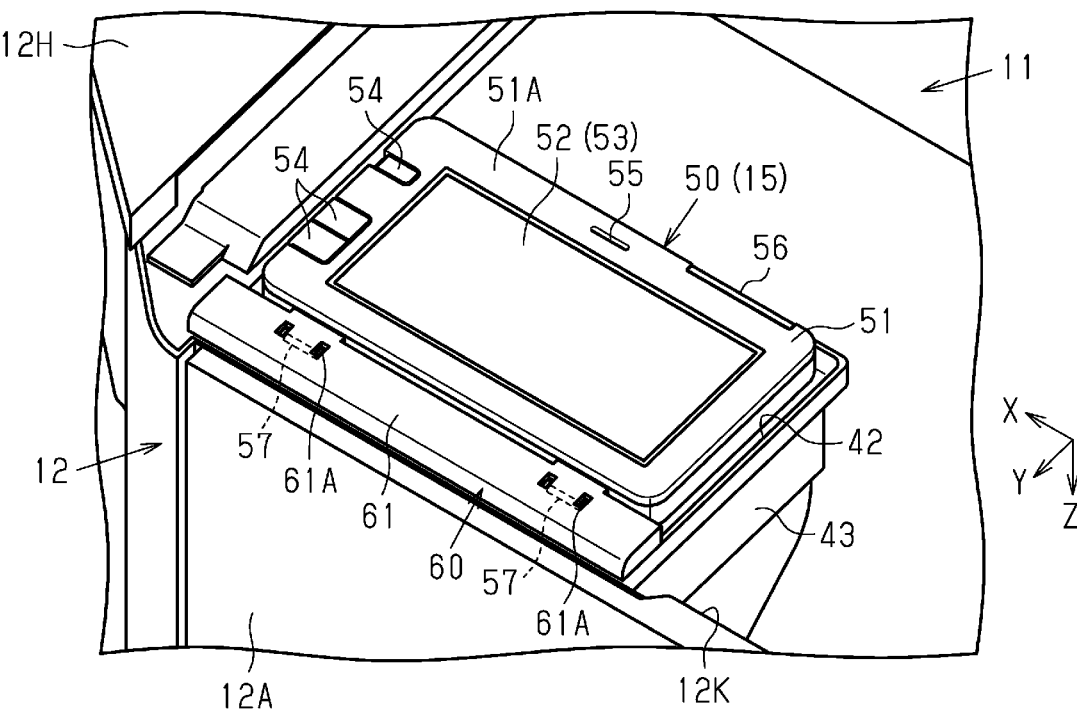
FIG. 4 is a perspective view showing the operation panel in a state where the cover member is removed.

Next, a configuration of the operation panel 50 will be described with reference to FIGS. 4 to 6. FIG. 4 shows the operation panel 50 in a state where the first cover member 41 is removed. As shown in FIG. 4, in a state where the first cover member 41 is removed, an opening 12K for exposing a rear portion other than the operation panel 50 and the storage section 42 for housing the operation panel 50 are exposed. A holding frame 43 having the recessed storage section 42 in its upper part is arranged below the operation panel 50.

As shown in FIG. 4, the printing device 11 includes the angle adjustment mechanism 60 configured to adjust the angle of the operation panel 50 (the operation section 15) with respect to the housing 12. The operation panel 50 includes a pivot shaft 57 serving as a pivot center when the angle is adjusted by the angle adjustment mechanism 60. In the example shown in FIG. 4, two pivot shafts 57 are provided at an end portion of the operation panel 50 downstream in the transport direction so as to be spaced from each other in the width direction X. The axis of the pivot shaft 57 is parallel to the width direction X. A holding member 61 for covering the two pivot shafts 57 is disposed at an adjacent position on the downstream of the operation panel 50 in the transport direction. Two pivot shafts 57 are pivotably held with respect to two holding sections 61A provided inside the holding member 61. The pivot shaft 57 and the holding member 61 constitute a part of the angle adjustment mechanism 60.

Figure 5:
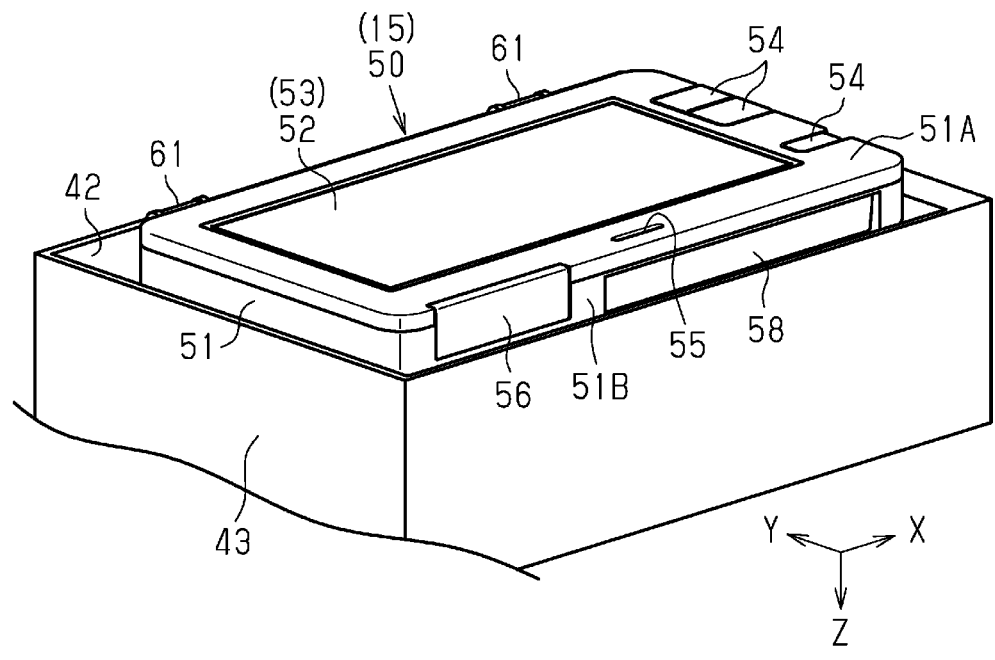
FIG. 5 is a perspective view showing the operation panel housed in the storage section.

As shown in FIG. 5, the operation section 15 has a finger hooking section 58 on an end surface 51B on the opposite side of the pivot shaft 57. The finger hooking section 58 is exposed from the top surface 12U (the upper surface of the first cover member 41) when the operation section 15 is raised to the predetermined angle (see FIG. 9). Therefore, after the operation section 15 is raised to the predetermined angle, the user puts his/her finger on the finger hooking section 58 to adjust the angle of the operation section 15 to a desired angle.

Figure 6:
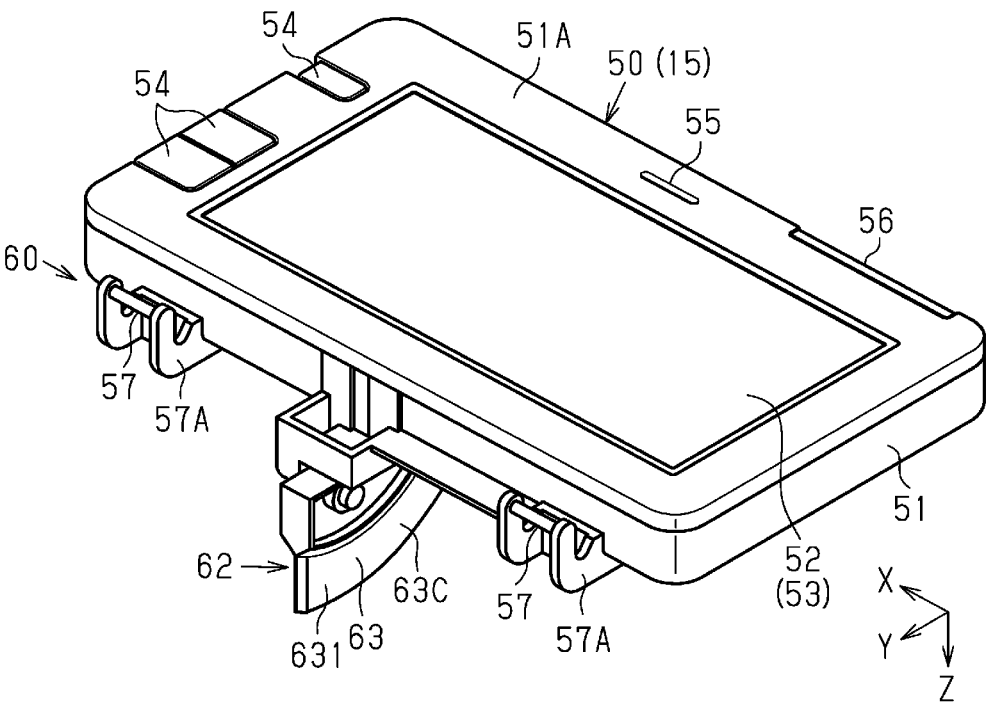
FIG. 6 is a perspective view showing the operation panel.

As shown in FIG. 6, the two pivot shafts 57 are fixed to respective distal end sections of a pair of extension sections 57A extending from the back surface side of the panel body 51. The angle adjustment mechanism 60 includes the pivot shaft 57 configured to adjust the angle of the operation panel 50, and an angle holding mechanism 62 for holding the operation panel 50 at a desired angle-adjusted angle.

The angle holding mechanism 62 holds the operation panel 50 at a desired angle by utilizing frictional force. Specifically, the angle holding mechanism 62 includes a receiving member 63 provided in the operation section 15. A receiving plate section 631 has, for example, a substantially arcuate shape corresponding to a part of a disk plate. The receiving member 63 is fixed to the back surface side of the operation panel 50 in a state where a direction orthogonal to a receiving surface 63C of the receiving plate section 631 is parallel to the axial line of the pivot shaft 57. When the operation panel 50 is pivoted about the pivot shaft 57, the receiving member 63 is also pivoted at the same angle as the operation panel 50. The detailed structure of the angle holding mechanism 62 will be described later.

Mechanism for Adjusting Angle of Operation Panel 50

Figure 7:
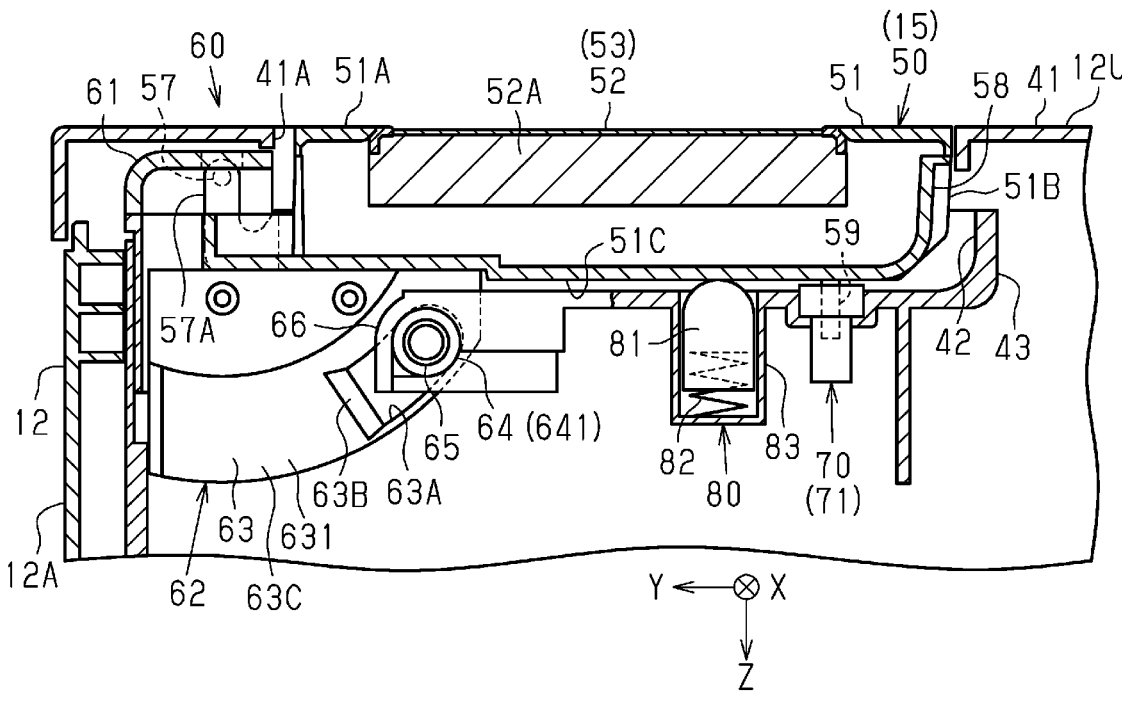
FIG. 7 is a schematic side cross-sectional view showing configuration of the operation panel in the housed posture and the periphery thereof.
Figure 8:
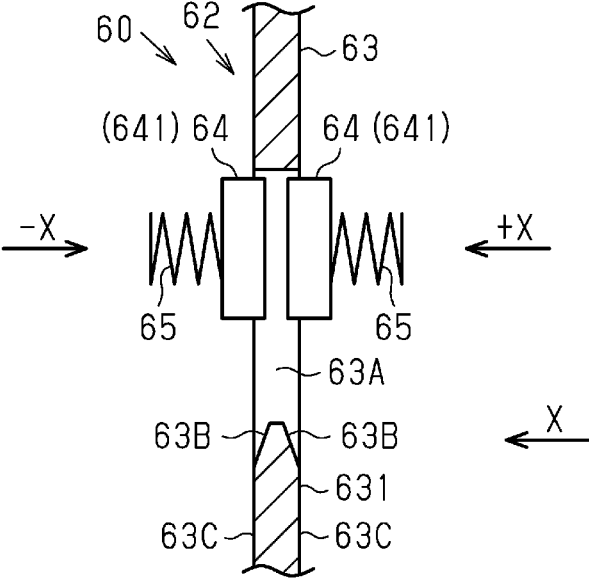
FIG. 8 is a schematic cross-sectional view showing the angle adjustment mechanism when the operation panel is in the housed posture.
Figure 9:
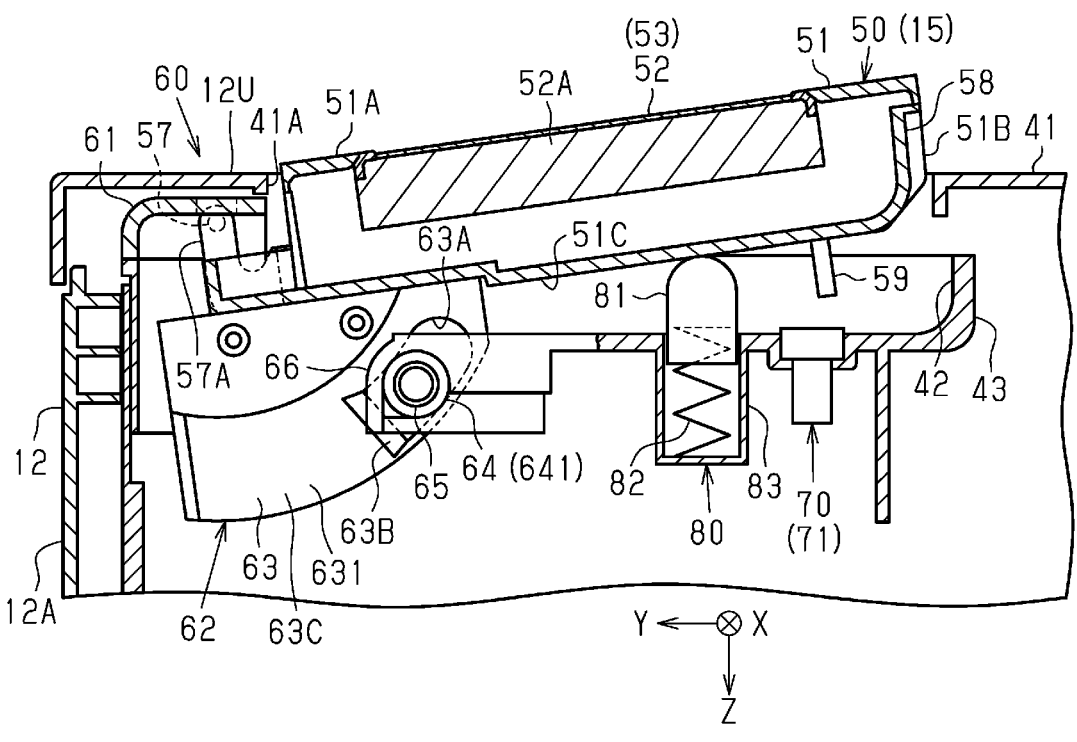
FIG. 9 is a schematic side cross-sectional view showing configuration of the operation panel in the raised posture and the periphery thereof.
Figure 10:
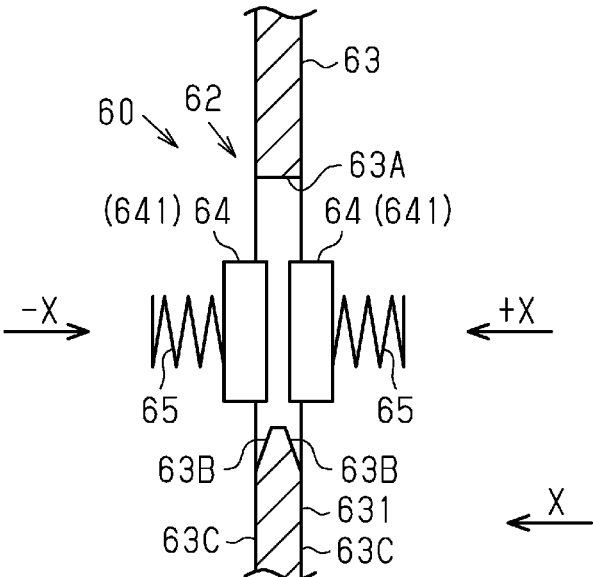
FIG. 10 is a schematic cross-sectional view showing the angle adjustment mechanism when the operation panel is in the raised posture.
Figure 11:
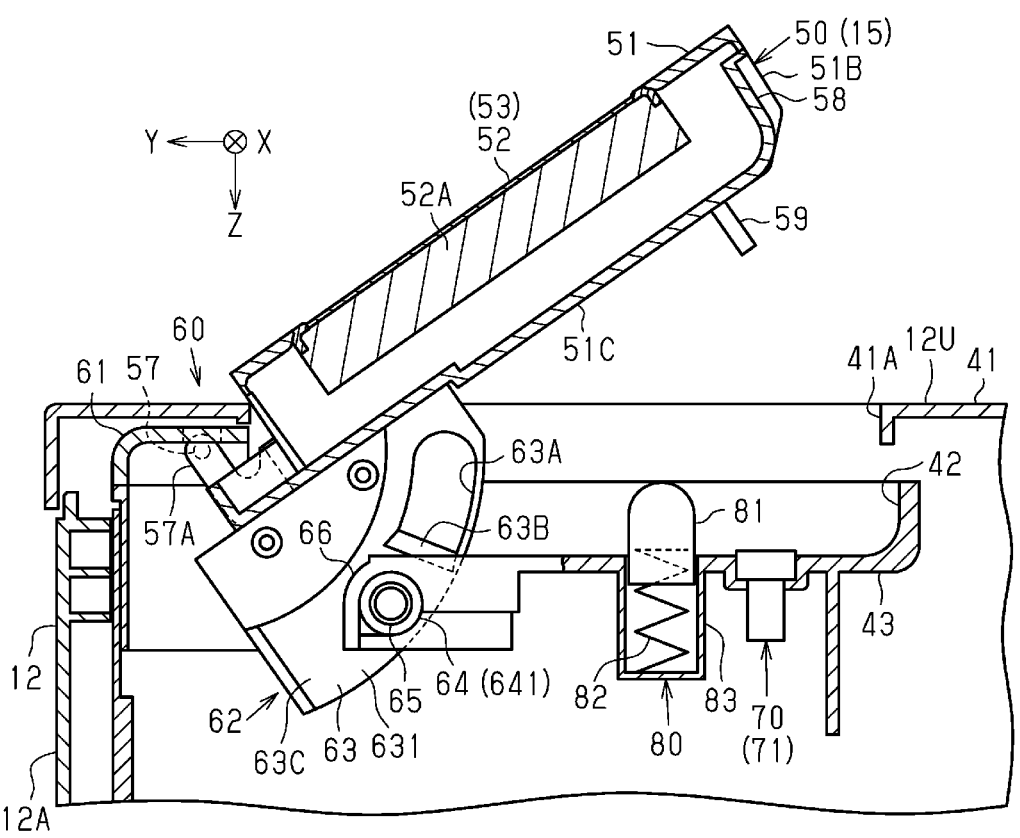
FIG. 11 is a schematic side sectional view showing the operation panel adjusted to a desired angle.
Figure 12:
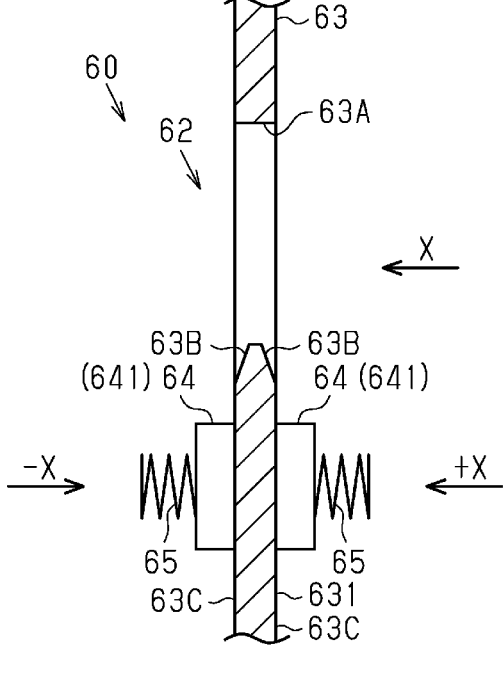
FIG. 12 is a schematic sectional view showing the angle adjustment mechanism when the operation panel is adjusted to a desired angle.

Next, a mechanism related to the angle adjustment of the operation panel 50 will be described with reference to FIGS. 7 to 12. FIG. 7 shows a side cross section of the operation panel 50 in the first posture, FIG. 9 shows a side cross section of the operation panel 50 in the second posture, and FIG. 11 shows a side cross section of the operation panel 50 in the third posture. FIG. 8 shows a cross section of the angle holding mechanism 62 when the operation panel 50 is in the first posture, FIG. 10 shows a cross section of the angle holding mechanism 62 when the operation panel 50 is in the second posture, and FIG. 12 shows a cross section of the angle holding mechanism 62 when the operation panel 50 is in the third posture.

As shown in FIG. 7, when the operation panel 50 is not in use, the operation panel 50 takes a first posture in which the operation panel 50 is housed in the storage section 42 in a state of being substantially flush with the top surface 12U.

Here, the top surface 12U is not formed with a recess for hooking the user's finger on the operation panel 50 in order to raise the operation panel 50 in the state of the first posture. When the user presses the position of the mark 55, the lock of the operation panel 50 is released, and the operation panel 50 is raised to the predetermined angle (see FIG. 9) by the biasing force of the spring 82. The operation panel 50 rises to assume the second posture. The mechanisms responsible for this raising operation are the locking mechanism 70 and the raising mechanism 80. The operation panel 50 incorporates a display circuit board section 52A that performs display control and the like.

As described above, the printing device 11 includes the locking mechanism 70 that locks the operation section 15 at a position (stored position) at which the operation section 15 is stored in the storage section 42. The locking mechanism 70 is a mechanism that locks the operation section 15 when the operation section 15 is stored in the storage section 42, and releases the locked state when the operation section 15 in the locked state is pressed from the outside. The locking mechanism 70 is, for example, a push latch mechanism 71. The push latch mechanism 71 is switched between the locked state and the unlocked state every time a pressing force is applied from the outside.

The locking mechanism 70 is disposed at a position facing a portion close to an end portion that, in the first posture, is at the opposite side of a back surface 51C of the operation panel 50 than is the pivot shaft 57. A locked section 59 projects almost vertically from the back surface 51C of the operation panel 50 to a position corresponding to the locking mechanism 70. The push latch mechanism 71 has a built-in mechanism including a locking member and a spring structure (not shown) that locks onto the locked section 59 when the locked section 59 is inserted and unlocks when the locked section 59 is pushed into the push latch mechanism 71 while the push latch mechanism 71 is in a state of being locked to the locked section 59.

The printing device 11 is provided with the above-described raising mechanism 80 for raising the operation section 15 to the predetermined angle when the locking state of the locking mechanism 70 is released. The raising mechanism 80 raises the operation section 15 to the predetermined angle when the locking state of the operation section 15 is released. The raising mechanism 80 is, for example, an auxiliary spring. More specifically, the raising mechanism 80 includes a cap 81 which can be brought into contact with the back surface 51C of the operation section 15, and the spring 82 which biases the cap 81 in the direction in which the operation section 15 is raised. The cap 81 and the spring 82 are housed in an accommodation section 83 of the holding frame 43. Due to the elastic force of the spring 82, the cap 81 pushes up the operation section 15, and the operation section 15 unlocked at the stored position is raised to the predetermined angle. When the operation section 15 is stored in the first posture, the cap 81 is in contact with the back surface 51C of the operation section 15 in a state where the spring 82 is compressed. When the lock of the operation section 15 is released, the cap 81 pushes up the back surface 51C of the operation section 15 to the predetermined angle by the elastic force of the spring 82.

When the operation section 15 is raised to the predetermined angle, the user can hook his/her finger on the operation panel 50. After the operation panel 50 is pivoted to a desired angle by hooking the user's finger, the operation panel 50 needs to be held at the desired angle. Therefore, the printing device 11 includes the angle adjustment mechanism 60 configured to adjust the angle of the operation section 15 with respect to the housing 12. The angle adjustment mechanism 60 is a tilt mechanism configured to tilt the operation section 15 with respect to the top surface 12U.

The angle adjustment mechanism 60 has a pivot function of pivoting the operation section 15 so that the user can adjust the angle of the operation section 15 and an angle holding function of holding the operation section 15 at the adjusted angle. The pivot function is performed by the pivot shaft 57 or the like, and the angle holding function is performed by the angle holding mechanism 62.

The angle adjustment mechanism 60 is provided with the receiving member 63 provided on the operation section 15 and a contacting member 64 for holding the operation section 15 at an arbitrary angle by contacting with the receiving surface 63C of the receiving member 63 with a predetermined force. The contacting member 64 comes into contact with the receiving surface 63C of the receiving member 63 with a predetermined force in a process in which the receiving member 63 moves together with pivot of the operation section 15 to an angle larger than the predetermined angle at which the operation section 15 is raised by the raising mechanism 80, thereby holding the operation section 15 at an arbitrary angle. The receiving member 63 and the contacting member 64 constitute the angle holding mechanism 62.

The receiving member 63 includes, for example, the receiving plate section 631. The contacting member 64 is a pair of pads 641 sandwiching the receiving plate section 631. The angle adjustment mechanism 60 includes biasing members 65 that bias the pair of pads 641 in the directions in which the receiving plate section 631 is sandwiched. The pads 641 are biased in directions (+X direction and –X direction) approaching each other by the pair of biasing members 65 (see FIG. 12 and the like). The pad 641 may be made of, for example, a synthetic resin material or rubber. The biasing member 65 is, for example, a spring.

The receiving plate section 631 is formed of, for example, a substantially arc-shaped plate section. The receiving member 63 is fixed to the back surface 51C side of the operation panel 50 in an orientation wherein a direction orthogonal to the receiving surface 63C of the receiving plate section 631 is parallel to the axial line of the pivot shaft 57. When the operation panel 50 is pivoted about the pivot shaft 57 for angle adjustment, the receiving member 63 is also pivoted by the same angle along with the operation panel 50.

The receiving member 63 moves while drawing an arc-shaped locus around the pivot shaft 57 along with the pivot of the operation panel 50. The receiving plate section 631 has an arc shape along the arc-shaped locus. The pair of contacting members 64 are disposed at predetermined positions on the arc-shaped locus of the receiving plate section 631 so as to face each other with the receiving plate section 631 interposed therebetween. The pair of contacting members 64 is supported by a support section 66 extending from the holding frame 43 so as to be displaceable in the width direction X.

As shown in FIG. 12, the pair of contacting members 64 comes into contact with the receiving surface 63C of the receiving plate section 631 with predetermined forces by the biasing forces of the pair of biasing members 65, whereby the operation panel 50 is held at an angle desired by the user (see FIG. 11). The operation panel 50 is held at a desired angle by static friction force acting on the receiving surfaces 63C when the pair of contacting members 64 come into contact with the receiving surface 63C on both sides in a state of sandwiching the receiving plate section 631.

Incidentally, in the raising process by the raising mechanism 80, if a relatively large frictional force acts between the receiving member 63 and the contacting member 64, the frictional force becomes a resistance force when the operation section 15 is raised by the biasing force of the spring 82. In this case, a biasing force of a magnitude sufficient to overcome the resistance force is required for the raising mechanism 80. Since increasing the biasing force of the spring 82 causes an increase in the size and cost of the spring 82, it is desirable that an unnecessary frictional force not act between the receiving member 63 and the contacting member 64 in the raising process of the operation section 15. The biasing force of the spring 82 also serves as a resistance force when the operation section 15 is housed in the storage section 42. Therefore, in order to reduce the operation force when the operation section 15 is housed in the storage section 42, it is desirable that an unnecessary frictional force not act between the receiving member 63 and the contacting member 64 in the raising process of the operation section 15.

Therefore, the receiving member 63 is provided with a portion wherein the contact force of the contacting member 64 against the receiving member 63 in the process in which the operation section 15 is raised to the predetermined angle when the locked state by the locking mechanism 70 is released is smaller than the contact force in the process in which the receiving member 63 moves together with the pivot to an angle larger than the angle at which the receiving member 63 is raised by the raising mechanism 80 of the operation section 15. Specifically, a portion where the contacting member 64 does not abut is provided. The part with which the contacting member 64 does not abut may be a hole 63A or a notch. The hole 63A or the notch may be provided in the receiving plate section 631. In the examples shown in FIGS. 7 to 12, the hole 63A is formed in the receiving plate section 631 as a portion where the contacting member 64 does not contact. In the receiving plate section 631, an inclined surface 63B is formed at a portion adjacent to the hole 63A on the arc-shaped locus (see FIGS. 7 and 8). The pair of pads 641 is guided along the inclined surface 63B in the movement from the hole 63A to the receiving surface 63C.

The receiving member 63 of the present embodiment includes a portion with which the contacting member 64 does not come into contact over the entire range of a region opposed by the contacting member 64 in a process in which the operation section 15 is raised to the predetermined angle. As shown in FIGS. 7 and 9, in the receiving plate section 631 of the receiving member 63, the hole 63A is formed over the entire range of a region opposed by the contacting member 64 in a process in which the operation section 15 is raised to the predetermined angle. Therefore, as shown in FIGS. 8 and 10, in each of the case where the operation section 15 is in the first posture and the case where the operation section 15 is in the second posture, the pair of contacting members 64 are opposed to each other via the hole 63A, and thus do not come into contact with the receiving plate section 631. In the receiving plate section 631, the hole 63A or a notch may be formed over a range of a part of a region where the contacting member 64 faces in the process of raising the operation section 15 to the predetermined angle. In other words, it is sufficient that the operation section 15 can be raised to the predetermined angle by the biasing force of the spring 82.

Operations of Embodiment

Next, the operations of the printing device 11 of the present embodiment will be described.

The user confirms the state of the printing device 11 and the operation contents by looking at the display section 52 of the operation panel 50. The user performs an input operation using the operation panel 50 to instruct the printing device 11. In any case, there is an angle at which the user can easily see the operation panel 50 and there is an angle at which the user can easily operate the operation panel 50. The user adjusts the operation panel 50 to a desired angle.

Hereinafter, the operation of the operation panel 50 will be described.

When not in use, the operation section 15 is housed in the storage section 42. When the operation section 15 is used, first, the user presses the position of the mark 55 on the operation panel 50. Then, when the locked section 59 of the operation panel 50 is pushed into the locking mechanism 70 (the push latch mechanism 71), the lock is released. When the lock of the locked section 59 is released, the cap 81 biased by the spring 82 of the raising mechanism 80 raises the operation panel 50 to the predetermined angle shown in FIG. 9.

As shown in FIG. 8, the pair of pads 641 constituting the angle adjustment mechanism 60 is located at a position corresponding to the hole 63A of the receiving plate section 631. Therefore, in a process in which the operation panel 50 is raised from the first posture, which is the housed posture, to the second posture, which is the raised posture, the pair of pads 641 relatively move in the hole 63A (see FIGS. 8 and 10). Therefore, even with a relatively small force due to the biasing force of the spring 82 of the raising mechanism 80, the operation panel 50 is pushed up by the cap 81 and is raised smoothly from the first posture to the second posture.

When the operation panel 50 is raised to the second posture shown in FIG. 9, the end surface 51B of the operation panel 50 is exposed. The user hooks his/her finger on the finger hooking section 58 to adjust the operation panel 50 to the desired angle shown in FIG. 11. The user can adjust the angle of the operation panel 50 to an arbitrary angle with respect to the top surface 12U, for example, within an angle adjustment range from the predetermined angle in the second posture to a maximum angle (for example, about 90 degrees).

As shown in FIG. 12, when the operation panel 50 is in the third posture within the angle adjustment range, the pair of pads 641 is in contact with the receiving surface 63C with a predetermined force in a state where the receiving plate section 631 is sandwiched. A large frictional force is generated between the pair of pads 641 and the receiving surface 63C of the receiving plate section 631. When the coefficient of static friction between the receiving plate section 631 and the pad 641 is $\mu$, the predetermined force with which the pad 641 presses the receiving plate section 631 is F, and the drag acting on the receiving surface 63C is N, the static friction force f1 is expressed by $f1=\mu*N$. Since there are two pads 641, a static frictional force of 2f1 acts between the pair of pads 641 and the receiving plate section 631. The magnitude of the drag force N is equal to the predetermined force F. The symbol "*" is a multiplication operator.

A force f2 for returning the operation panel 50 to the housed posture by its own weight acts on the pivoting portions of the operation panel 50, the receiving member 63, and the like. The coefficient of static friction p between the pad 641 and the receiving plate section 631 and the like are set so as to satisfy 2f1>f2max regardless of the posture angle of the operation panel 50. Here, f2max is the maximum value of the force f2, which changes in accordance with the adjustment angle of the operation panel 50. However, in practice, there is a problem that the operation panel 50 is moved only by lightly touching the operation panel 50 whose angle has been adjusted. Therefore, a margin of the force f3 is set so that the angle of the operation panel 50 is maintained even when a small force f3 is applied. For example, the coefficient of static friction $\mu$ and the like are set so as to satisfy 2f1>f2max+f3.

When the user finishes using the printing device 11, the user stores the operation panel 50 in the storage section 42 by pivoting the operation panel 50 from the desired angle of the third posture to the first posture. In this process, when the operation panel 50 reaches the second posture, the back surface 51C of the operation panel 50 comes into contact with the cap 81, and in the process from the second posture to the first posture, the cap 81 is pushed down against the biasing force of the spring 82. When the operation panel 50 is stored in the storage section 42 in the first posture shown in FIG. 7, the locked section 59 is locked by the locking mechanism 70. As a result, the operation panel 50 is held in the first posture.

As described above, the recess for hooking the finger is not required around the operation panel 50. Therefore, as shown in FIG. 2, the top surface 12U of the printing device 11 when the operation panel 50 is housed can be designed to have a flush surface with almost no irregularities or gaps. Since there is no recess for finger hooking around the operation panel 50 on the top surface 12U, a small stationery object such as a clip does not fall into the recess. It is possible to solve the problem that dust is easily accumulated in the recess and the problem that it is difficult to clean the dust accumulated in the recess.

Therefore, according to the present embodiment, the following effects are obtained.

(1) The printing device 11 includes the operation section 15, the storage section 42, the angle adjustment mechanism 60, the locking mechanism 70, and the raising mechanism 80. The operation section 15 is provided on the top surface 12U of the housing 12, and receives an input for controlling the operation of the printing device 11. The storage section 42 is provided in the housing 12 and houses the operation section 15. The angle adjustment mechanism 60 is configured to adjust the angle of the operation section 15 with respect to the housing 12. The locking mechanism 70 locks the operation section 15 at a position where the operation section 15 is housed in the storage section 42. The raising mechanism 80 raises the operation section 15 to the predetermined angle when the locked state of the locking mechanism 70 is released. The locking mechanism 70 is configured to enter a locking state in which the locking mechanism 70 locks with the operation section 15 when the operation section 15 is housed in the storage section 42, and to switch from the locked state to the unlocked state when a specific operation is performed on the operation section 15 in the locked state. The angle adjustment mechanism 60 is provided with the receiving member 63 provided in the operation section 15, and the contacting member 64 for holding the operation section 15 at an arbitrary angle by contacting the receiving surface 63C of the receiving member 63 with a predetermined force in a process in which the receiving member 63 moves together with pivot to an angle larger than the predetermined angle to which the raising mechanism 80 raised the operation section 15. The receiving member 63 is provided with a portion where the contacting force of the contacting member 64 to the receiving member 63 becomes smaller than the predetermined force in the process of the operation section 15 being raised by the prescribed angle when the locking state by the locking mechanism 70 is released.

According to this configuration, when the locked state by the locking mechanism 70 is released, since the contacting force of the contacting member 64 on the receiving member 63 is small, the raising mechanism 80 can raise the operation section 15 to the predetermined angle even with a relatively small force. When the operation section 15 is raised to the predetermined angle, the end surface 51B of the operation section 15 is exposed. The user adjusts the operation section 15 to a desired angle by hooking a finger on the end surface. Since the contacting member 64 comes into contact with the receiving member 63 with a predetermined force, the operation section 15 is held at a desired angle. Therefore, the user can raise the operation section 15 at a desired angle without using a recess for finger hooking provided around the operation section 15 in the housing 12. Therefore, it is also possible to eliminate the recess for finger hooking from the housing 12. Note that a recess for design, a recess for stationery object accommodation, a recess for other purposes, and a recess for finger hooking may be provided around the operation section 15. Even if there is at least one of these recesses, the user can raise the operation section 15 to a desired angle without using the recess for finger hooking.

(2) The locking mechanism 70 is the push latch mechanism 71, and the locked state and the unlocked state are switched each time a pressing force is applied from the outside as a specific operation. According to this configuration, since the locked state and the unlocked state are switched each time the user applies a pressing force, the operation is simple, and the locking mechanism 70 can be made with a simple configuration.

(3) The receiving member 63 has the receiving plate section 631. The contacting member 64 is the pair of pads 641 that sandwich the receiving plate section 631, and includes the biasing members 65 that bias the pads 641 in the directions in which the pair of pads 641 sandwich the receiving plate section 631. According to this configuration, the operation section 15 can be held at a desired angle with a simple configuration.

(4) The portion of the receiving member 63 where the contacting force of the contacting member 64 against the receiving member 63 is smaller than the predetermined force is the hole 63A provided in the receiving plate section 631. In this way, the portion where the contacting force becomes smaller than the predetermined force may be a portion such as the hole 63A where the contacting member 64 does not contact the receiving member 63. According to this configuration, a portion where the contact force of the contacting member 64 against the receiving member 63 is smaller than a predetermined force can be realized with a simple configuration. The same effect can be obtained by forming a notch instead of the hole 63A.

(5) The operation section 15 is provided further inward than the outer periphery of the top surface 12U of the housing 12. For example, when the operation section 15 is disposed so as to be in contact with a part of the outer periphery of the top surface 12U of the housing 12, the end surface of the operation section 15 is exposed at a portion in contact with a part of the outer periphery, so that the operation section 15 can be pivoted to a desired angle by hooking a finger on the exposed end face. However, in this case, the arrangement position of the operation section 15 on the top surface 12U of the housing 12, the position and orientation of the pivot shaft 57, and the like are restricted. On the other hand, according to the present configuration, when a pressing operation is performed as the specific operation on the operation section 15, the operation section 15 can be raised to the predetermined angle. Therefore, even if the operation section 15 is located further inward than the outer periphery on the top surface 12U of the housing 12, the end surface 51B of the operation section 15 can be exposed, so that the arrangement position and orientation of the operation section 15 and the position and orientation of the pivot shaft 57 are not restricted at all. That is, even if the operation section 15 is disposed further inward than the outer periphery on the top surface 12U of the housing 12, the arrangement position and direction of the operation section 15 and the position and direction of the pivot shaft 57 can be freely set.

(6) The operation section 15 includes a pivot shaft 57 serving as a pivot center when the angle adjustment is performed by the angle adjustment mechanism 60. The operation section 15 includes a finger hooking section 58 on the end surface 51B on a side opposite to the pivot shaft 57. According to this configuration, since the finger hooking section 58 is provided on the end surface 51B that is exposed after the operation section 15 is raised, it is easy to adjust the angle of the operation section 15 by hooking a finger on the finger hooking section 58.

(7) The operation section 15 includes the display section 52 that displays a state of the printing device 11 and operation contents. According to this configuration, it is easy for the user to operate the angle adjustment in order to view the state and the operation content of the printing device 11 displayed on the display section 52 of the operation section 15.

(8) A touch panel 53 for operation input and an operation button 54 are provided. According to this configuration, it is easy for the user to operate angle adjustment in order to perform an input operation using the touch panel 53 for operation input and the operation button 54.

The above-described embodiment may be modified into the following modifications. Further, an appropriate combination of the above-described embodiment and modifications described below may be used as a further modification, and an appropriate combination of modifications described below may be used as a further modification.

The pair of pads 641 may include a fixed pad 641 and a movable pad 641. A single biasing member 65 that biases only the movable pad 641 may be provided.

In the above embodiment, the configuration for releasing the locking of the locking mechanism 70 is not limited to the pressing force applied to the operation section 15. The configuration may be a specific operation other than the pressing force applied to the operation section 15. For example, an operated portion may be provided in the operation section 15, and the operation to the operated portion by the user may be a specific operation. The operated portion may be, for example, a push button. As the specific operation, the user may operate a push button to release the locking of the locking mechanism 70 by the operation force. Alternatively, the control section 100 may electrically release the locking of the locking mechanism 70 based on an operation signal when the push button is operated as a specific operation. Further, for example, the configuration may be a contact sensor or a proximity sensor, wherein the contact sensor outputs an operation signal when the user touches the operation section 15 with his/her finger as a specific operation, and the proximity sensor outputs an operation signal when the user brings his/her finger close to the operation section 15 as a specific operation. In these cases, the control section 100 may electrically release the locking of the locking mechanism 70 based on the operation signal.

The biasing member 65 is not limited to a spring, and may be a drive section such as a solenoid or a cylinder. The pad 641 may be brought into contact with the receiving surface 63C with a predetermined force by the power of the drive section.

The contacting member 64 may not be biased by the biasing member 65. In other words, the biasing member 65 may be omitted. For example, the contacting member 64 may be disposed at a position where the contacting member 64 can be brought into pressure contact with the receiving member 63 (for example, the receiving plate section 631) with the predetermined force. In this case, the contacting member 64 may be a member made of a wear-resistant synthetic resin material, a synthetic resin material having rubber elasticity, rubber, or the like. In other words, the contacting member 64 may be configured to come into contact with the receiving surface 63C with a predetermined force so that it can slide over the receiving surface 63C with a predetermined contact pressure in the pivot process of the operation section 15 from the predetermined angle.

The receiving member 63 is not limited to the hole 63A or the notch, and may be provided with a recess formed so as to have a thickness such that the contacting member 64 does not come into contact with the operation section 15 in a process in which the operation section 15 is raised to a predetermined angle when the locking state by the locking mechanism 70 is released. The receiving member 63 may be formed to have such a thickness that the contact force by the contacting member 64 does not hinder the raising of the operation section 15 as a resistance force against the biasing force of the spring 82 even if the contacting member 64 contacts the receiving plate section 631 in the process in which the operation section 15 is raised to a predetermined angle when the locking state by the locking mechanism 70 is released.

In the embodiment, the finger hooking section 58 may be provided on one or both of the left and right side surfaces of the operation section 15, which are surfaces orthogonal to the axis of the pivot shaft 57.

The pivot shaft 57 may be disposed on the left end side or the right end side of the operation panel 50 as viewed from the front of the printing device 11. In this case, the user operates the operation section 15 from the side of the printing device 11. Also, in this case, the operation section 15 may have the finger hooking section 58 on the end surface opposite to the pivot shaft 57.

The operation section 15 may be configured to move in parallel, in addition to pivoting. For example, a configuration may be adopted in which the raising of the operation section 15 from the housed posture is performed by parallel movement upward while maintaining the horizontal posture, and the user adjusts the angle to a desired angle by pivoting the operation section 15 in the raised horizontal posture.

The operation section 15 may not include the display section 52. The operation section 15 may be, for example, the operation panel 50 including one or more switch-type operation buttons 54.

The operation section 15 may be the operation panel 50 that includes only the display section 52 and does not include the operation button 54.

In the configuration in which the operation section 15 is housed in the storage section 42 of the housing 12, a recess for finger hooking may be provided around the operation section 15. For example, a recessed portion for finger hooking may be left as an auxiliary portion. It is possible to eliminate a situation in which a user who is unfamiliar with the device cannot raise the operation section 15 due to the absence of the recess for finger hooking. In this case, since it is an auxiliary recess, the size of the recess may be smaller than that in the related art. Also in this configuration, it is possible to prevent an aesthetic design of the electronic device such as the printing device 11 from being damaged by the recess, and it is possible to reduce the frequency with which small stationery object falls into the recess. As described above, since the recess for finger hooking is auxiliary, the user can relatively easily raise the operation section 15 without using the recess. When the auxiliary recess is provided, an opening or closing type cover for closing the recess may be provided. For example, the cover may be biased upward by the biasing force of the spring, and the end surface of the operation section 15 may be exposed when the cover is pushed in.

A recess may be provided around the operation section 15 for a purpose other than finger-hooking or to enhance aesthetic design.

The top surface 12U on which the operation section 15 is provided is not limited to a horizontal surface, that is, a surface orthogonal to the vertical direction Z. The top surface 12U may be an inclined surface at an acute angle relative to a horizontal plane. In this specification, the top surface 12U is a surface portion of the outer peripheral surface of the electronic device (for example, the printing device 11) which can be visually checked when viewed from above in the vertical direction Z. At least an area of the top surface 12U around the storage section 42 is not limited to a flat surface, and may be a surface formed of a set of a plurality of surface portions having different angles, or a curved surface. The curved surface may be a convex surface or a concave surface.

The operation section 15 may be provided on a side surface of the housing 12. In this case, the operation panel 50 as the operation section 15 is configured to pivot around the pivot shaft 57 at the upper end so that the angle can be adjusted to an angle that is easy to see when the user watches the operation panel 50 obliquely from above.

The printing device 11 is not limited to an inkjet printer. For example, an electrophotographic printer such as a laser printer, a dot impact printer, a thermal printer, or the like may be used. The printing device 11 may be a textile printing device.

The printing device 11 is not limited to a serial printer, and may be a line printer or a page printer. In a case where the printing device 11 is a line printer, the printing section 30 does not include the carriage 31, and includes the print head 32 capable of simultaneously printing a range longer than the maximum width of the medium 23. The print head 32 performs printing on the medium 23 transported at a predetermined speed by the transport mechanism 20.

The printing device 11 is not limited to a large format printer configured to print on the medium 23 having a large size, but may be an office or personal printer configured to print on the medium 23 having a relatively small size, such as the medium having a maximum size of A4 or A3.

The printing device 11 may be a multifunction printer including a scanner (image reading section).

The electronic device is not limited to the printing device, and may be a scanner (image reading device), a projector, or the like. Furthermore, it may be a video device such as a television, an audio device, a digital camera, a refrigerator, an electronic cooker such as a microwave oven, or an air conditioning equipment such as an air conditioner.

Hereinafter, technical ideas grasped from the embodiment and the modification examples will be described together with effects.

(A) An electronic device includes an operation section that is provided on a top surface or a side surface of a housing and on which input for controlling an operation of the electronic device is performed, a storage section that is provided in the housing and in which the operation section is stored, an angle adjustment mechanism configured to adjust an angle of the operation section with respect to the housing, a locking mechanism configured to lock the operation section at a position where the operation section is housed in the storage section, and a raising mechanism for raising the operation section to a predetermined angle when the locked state of the locking mechanism is released, wherein the locking mechanism is configured to enter a locked state in which the locking mechanism locks with the operation section when the operation section is housed in the storage section and to switch from the locked state to the unlocked state when a specific operation is performed on the operation section in the locked state, the angle adjustment mechanism has a receiving member located in the operation section and a contacting member configured to hold the operation section at an arbitrary angle by contacting with a predetermined force against a receiving surface of the receiving member in a process of moving together with the receiving member pivoting to an angle larger than the predetermined angle raised by the raising mechanism of the operation section, and the receiving member includes a portion in which a contacting force of the contacting member against the receiving member becomes smaller than the predetermined force in a process in which the operation section is raised to the predetermined angle when the locked state by the locking mechanism is released.

According to this configuration, since the contacting force of the contacting member against the receiving member is smaller than the predetermined force when the locked state by the locking mechanism is released, the raising mechanism can raise the operation section to the predetermined angle with a relatively small force. When the operation section is raised to a predetermined angle, the end surface of the operation section is exposed. The user puts his/her finger on the end surface to adjust the operation section to a desired angle. When the contacting member comes into contact with the receiving member with a predetermined force, the operation section is held at a desired angle. Therefore, the user can raise the operation portion at a desired angle without using a recess for finger hooking provided around the operation section in the housing. Therefore, it is also possible to eliminate the recess for finger hooking from the housing. Note that a recess for aesthetic design, a recess for stationery object storage, a recess for other purposes, and moreover, a recess for finger hooking may be provided around the operation section in the housing. Regardless of the presence or absence of at least one of these recesses, the user can raise the operation section to a desired angle without using the recess for finger hooking.

(B) In the electronic device described above, the locking mechanism may be a push latch mechanism, and the locked state and the unlocked state may be switched each time a pressing force is applied from the outside as the specific operation. According to this configuration, since the locked state and the unlocked state are switched each time the user applies a pressing force, the operation is simple, and the locking mechanism can be made with a simple configuration.

(C) In the electronic device according to (A) or (B), the receiving member may include a receiving plate section, the contacting member may be a pair of pads sandwiching the receiving plate section and may further include a biasing member that biases the pair of pads in directions in which the receiving plate section is sandwiched. According to this configuration, the operation section can be held at a desired angle with a simple configuration.

(D) In the electronic device described above, the portion of the receiving member in which the contacting force of the contacting member with the receiving member is smaller than the predetermined force may be a hole or a notch provided in the receiving plate section. According to this configuration, a portion where the contacting force of the contacting member against the receiving member is smaller than a predetermined force can be realized with a simple configuration.

(E) In the electronic device according to any one of (A) to (D) described above, the operation section may be provided on the top surface of the housing and further inward than the outer periphery. According to this configuration, even when the operation section is provided on the top surface of the housing and further inward than the outer periphery, the operation section can be raised. For example, if the operation section is arranged so as to be in contact with a part of the outer periphery on the top surface of the housing, a part of the end surface is exposed in the housed state of the operation section, and thus it is possible to adopt a configuration in which user hooks with a finger on the end surface to raise the operation section. However, in this case, the arrangement position of the operation section on the top surface of the housing, the position and orientation of the pivot shaft, and the like are restricted. On the other hand, in this configuration, even if the operation section is located further inward than the outer periphery on the top surface of the housing, if a specific operation is performed on the operation section, the operation section rises and the end surface is exposed. Since the end surface of the operation section is exposed, there is no restriction on the arrangement position of the operation section, the position and direction of the pivot shaft, or the like.

(F) In the electronic device according to any one of (A) to (E), the operation section may include a pivot shaft serving as a pivot center when the angle is adjusted by the angle adjustment mechanism and a recessed portion for finger hooking on an end surface that is on the opposite side from the pivot shaft. According to this configuration, since the end surface of the operation section is exposed after the operation section is raised, a finger can be hooked on the end surface.

(G) In the electronic device according to any one of (A) to (F), the operation section may include a display section that displays a state of the electronic device and operation content. According to this configuration, it is easy for the user to operate the angle adjustment in order to see the state and the operation content of the electronic device displayed on the display section of the operation section.

(H) In the electronic device according to any one of (A) to (G), the operation section may include a touch panel configured to be operated for input and an operation button. According to this configuration, it is easy for the user to perform an input operation using the touch panel for operation input and the operation button.

What is claimed is:

1. An electronic device comprising:
an operation section that is provided on a top surface or a side surface of a housing and on which input for controlling an operation of the electronic device is performed;
a storage section that is provided in the housing and in which the operation section is stored;
an angle adjustment mechanism configured to adjust an angle of the operation section with respect to the housing;
a locking mechanism configured to lock the operation section at a position where the operation section is housed in the storage section; and
a raising mechanism for raising the operation section to a predetermined angle when the locked state of the locking mechanism is released, wherein
the locking mechanism is configured to enter a locked state in which the locking mechanism locks with the operation section when the operation section is housed in the storage section and to switch from the locked state to the unlocked state when a specific operation is performed on the operation section in the locked state,
the angle adjustment mechanism includes
a receiving member located in the operation section and
a contacting member configured to hold the operation section at an arbitrary angle by contacting with a predetermined force against a receiving surface of the receiving member in a process of moving together with the receiving member pivoting to an angle larger than the predetermined angle raised by the raising mechanism of the operation section, and the receiving member includes a portion in which a contacting force of the contacting member against the receiving member becomes smaller than the predetermined force in a process in which the operation section is raised to the predetermined angle when the locked state by the locking mechanism is released.

2. The electronic device, according to claim 1, wherein the locking mechanism is a push latch mechanism, and the locked state and the unlocked state are switched each time a pushing force is applied from the outside as the specific operation.

3. The electronic device, according to claim 1, wherein the receiving member includes a receiving plate section and the contacting member is a pair of pads sandwiching the receiving plate section and includes a biasing member that biases the pair of pads in directions in which the receiving plate section is sandwiched.

4. The electronic device, according to claim 3, wherein in the receiving member, the portion where the contacting force of the contacting member against the receiving member is smaller than the predetermined force is a hole or a notch provided in the receiving plate section.

5. The electronic device, according to claim 1, wherein the operation section is provided on the top surface of the housing and further inward than the outer periphery.

6. The electronic device, according to claim 1, wherein the operation section includes a pivot shaft serving as a pivot center when the angle is adjusted by the angle adjustment mechanism and a recessed portion for finger hooking on an end surface that is on the opposite side from the pivot shaft.

7. The electronic device, according to claim 1, wherein the operation section includes a display section configured to display a state of the electronic device and operation content.

8. The electronic device, according to claim 1, wherein the operation section includes a touch panel configured to be operated for input and an operation button.

* * * * *